US011126697B2

(12) United States Patent
Gaur et al.

(10) Patent No.: US 11,126,697 B2
(45) Date of Patent: *Sep. 21, 2021

(54) MICROSERVICES INTER-OPERATIONAL TRUST MANAGEMENT

(71) Applicant: International Business Machines Corporation, Armonk, NY (US)

(72) Inventors: Nitin Gaur, Round Rock, TX (US); Aaron J. Quirk, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 313 days.

This patent is subject to a terminal disclaimer.

(21) Appl. No.: 16/275,956

(22) Filed: Feb. 14, 2019

(65) Prior Publication Data
US 2019/0180002 A1 Jun. 13, 2019

Related U.S. Application Data

(63) Continuation of application No. 15/015,989, filed on Feb. 4, 2016, now Pat. No. 10,255,413.

(51) Int. Cl.
*G06F 21/00* (2013.01)
*H04L 29/06* (2006.01)
*G06F 21/57* (2013.01)
*G06F 21/62* (2013.01)

(52) U.S. Cl.
CPC .............. *G06F 21/00* (2013.01); *G06F 21/57* (2013.01); *G06F 21/629* (2013.01); *H04L 63/0807* (2013.01)

(58) Field of Classification Search
CPC ........ G06F 21/00; G06F 21/57; G06F 21/629; H04L 63/0807; H04L 29/06
See application file for complete search history.

(56) References Cited

U.S. PATENT DOCUMENTS

| 7,822,860 | B2 | 10/2010 | Brown et al. | |
|---|---|---|---|---|
| 8,528,059 | B1* | 9/2013 | Labana | H04L 63/08 726/5 |
| 8,843,997 | B1* | 9/2014 | Hare | H04L 63/0815 726/3 |

(Continued)

OTHER PUBLICATIONS

Author Unknown, What is Docker?, Webpage/site, Printed from website on Jan. 26, 2016, pp. 1-10, docker.com, Published at: https://www.docker.com/whatisdocker/.

(Continued)

*Primary Examiner* — Quazi Farooqui
(74) *Attorney, Agent, or Firm* — William H. Hartwell

(57) ABSTRACT

A microservice join request is received by a first microservice from a second microservice within a microservices system. The microservice join request includes microservice trust relationship information of the second microservice that defines microservice credentials and service description parameters of the second microservice. Using the microservice trust relationship information, a determination is made as to whether a consensus exists among other microservices within the microservices system that the second microservice is authorized to inter-operate within the microservices system. In response to determining that the consensus exists, validated local run-time inter-operational microservice trust relationship information is created.

20 Claims, 5 Drawing Sheets

(56) References Cited

U.S. PATENT DOCUMENTS

| | | | |
|---|---|---|---|
| 8,930,693 B2 | 1/2015 | Holt et al. | |
| 2015/0186636 A1* | 7/2015 | Tharappel | H04L 9/3231 |
| | | | 726/8 |
| 2017/0230349 A1 | 8/2017 | Gaur et al. | |

OTHER PUBLICATIONS

Author Unknown, Linking containers together, Webpage/site, Printed from website on Oct. 28, 2015, pp. 1-11, docker.com, Published at: https://docs.docker.com/userguide/dockerlinks/.

Author Unknown, Microservices, Wikipedia.org (via Web Archive), Jan. 10, 2016, pp. 1-5, Wikimedia Foundation, Inc., Published at: https://web.archive.org/web/20160110115247/https://en.wikipedia.org/wiki/Microservices.

IBM, List of IBM Patents or Patent Applications Treated as Related, Applicant Appendix, Feb. 14, 2019, pp. 1-2, the contents of which are incorporated herein by reference in their entirety.

United States Patent and Trademark Office, Office Action for U.S. Appl. No. 15/015,989, dated Feb. 16, 2018, pp. 1-24, Alexandria, VA, USA.

United States Patent and Trademark Office, Office Action for U.S. Appl. No. 15/015,989, dated Jul. 30, 2018, pp. 1-22, Alexandria, VA, USA.

United States Patent and Trademark Office, Notice of Allowance for U.S. Appl. No. 15/015,989, dated Nov. 15, 2018, pp. 1-10, Alexandria, VA, USA.

United States Patent and Trademark Office, Corrected Notice of Allowance for U.S. Appl. No. 15/015,989, dated Nov. 21, 2018, pp. 1-8, Alexandria, VA, USA.

* cited by examiner

400

402 — RECEIVE, BY A PROCESSOR EXECUTING A FIRST MICROSERVICE FROM A SECOND MICROSERVICE WITHIN A MICROSERVICES SYSTEM, A MICROSERVICE JOIN REQUEST COMPRISING MICROSERVICE TRUST RELATIONSHIP INFORMATION OF THE SECOND MICROSERVICE THAT DEFINES MICROSERVICE CREDENTIALS AND SERVICE DESCRIPTION PARAMETERS OF THE SECOND MICROSERVICE

404 — DETERMINE, USING THE MICROSERVICE TRUST RELATIONSHIP INFORMATION OF THE SECOND MICROSERVICE, WHETHER A CONSENSUS EXISTS AMONG OTHER MICROSERVICES WITHIN THE MICROSERVICES SYSTEM THAT THE SECOND MICROSERVICE IS AUTHORIZED TO INTER-OPERATE WITHIN THE MICROSERVICES SYSTEM

406 — CREATE, IN RESPONSE TO DETERMINING THAT THE CONSENSUS EXISTS, VALIDATED LOCAL RUN-TIME INTER-OPERATIONAL MICROSERVICE TRUST RELATIONSHIP INFORMATION

408 — RECEIVE AT LEAST ONE RUN-TIME INTER-OPERATION REQUEST THAT COMPRISES A RELATIONSHIP TRUST TOKEN FROM THE SECOND MICROSERVICE

410 — ESTABLISH A RUN-TIME INTER-OPERATIONAL CONNECTION WITH THE SECOND MICROSERVICE IN RESPONSE TO DETERMINING THAT PARAMETERS OF THE RELATIONSHIP TRUST TOKEN MATCH THE DEFINED MICROSERVICE CREDENTIALS AND SERVICE DESCRIPTION PARAMETERS OF THE SECOND MICROSERVICE WITHIN THE VALIDATED LOCAL RUN-TIME INTER-OPERATIONAL MICROSERVICE TRUST RELATIONSHIP INFORMATION

FIG. 4

MICROSERVICES INTER-OPERATIONAL TRUST MANAGEMENT

BACKGROUND

The present invention relates to microservice deployment in cloud computing environments. More particularly, the present invention relates to microservice inter-operational trust management.

Cloud computing is used to deploy applications and services in a distributed manner. Consumers of cloud computing resources or services do not necessarily know where the respective resources or services are hosted within a particular cloud computing environment.

SUMMARY

A computer-implemented method includes receiving, by a processor executing a first microservice from a second microservice within a microservices system, a microservice join request including microservice trust relationship information of the second microservice that defines microservice credentials and service description parameters of the second microservice; determining, using the microservice trust relationship information of the second microservice, whether a consensus exists among other microservices within the microservices system that the second microservice is authorized to inter-operate within the microservices system; creating, in response to determining that the consensus exists, validated local run-time inter-operational microservice trust relationship information.

A system that performs the computer-implemented method and a computer program product that causes a computer to perform the computer-implemented method are also described.

BRIEF DESCRIPTION OF THE DRAWINGS

FIG. 4 is a flow chart of an example of an implementation of a process for microservice inter-operational trust management according to an embodiment of the present subject matter.

DETAILED DESCRIPTION

Figure 1:
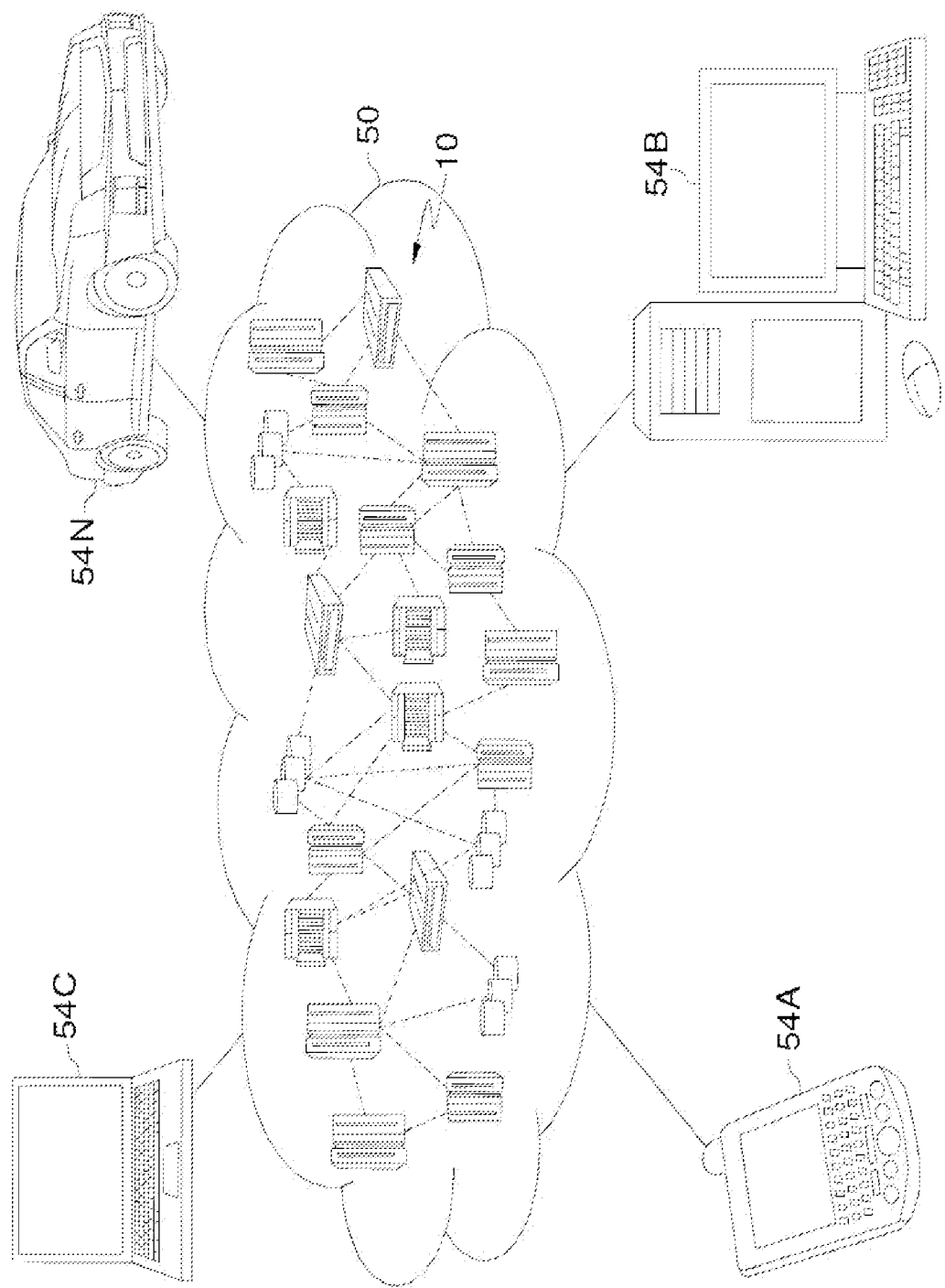
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides microservice inter-operational trust management. The present technology solves a recognized microservice deployment problem by providing technology that includes a new form of trust management that facilitates improved automated computational processing for deployment and run-time inter-operations of microservices within complex cloud computing environments.

The technology described herein operates by receiving, by a processor executing a first microservice from a second microservice within a microservices system, a microservice join request comprising microservice trust relationship information of the second microservice that defines microservice credentials and service description parameters of the second microservice. Using the microservice trust relationship information of the second microservice, the processing determines whether a consensus exists among other microservices within the microservices system that the second microservice is authorized to inter-operate within the microservices system. In response to determining that the consensus exists, validated local run-time inter-operational microservice trust relationship information is created. At least one run-time inter-operation request is received that includes a relationship trust token from the second microservice. A run-time inter-operational connection is established with the second microservice in response to determining that parameters of the relationship trust token match the defined microservice credentials and service description parameters of the second microservice within the validated local run-time inter-operational microservice trust relationship information.

A "container" within cloud computing terminology represents a compartmentalized microservice or application. A deployable container is a lightweight, portable, and self-sufficient entity capable of being automatically deployed to and run from virtually anywhere within a cloud computing environment. Microservices may be deployed for granular timeframes, and may be change periodically (e.g., may change every day or every two days). The description herein uses the terms "container," "microservice," and "node" interchangeably for ease of reference within the respective portions of the description herein.

Certain open platforms exist that allow developers and systems administrators to build, ship, and run distributed applications or microservices within complex microservices environments, such as cloud computing environments. These open platforms may consist of two base entities: an "engine," which is a portable, lightweight runtime and packaging tool; and a "hub," which is a cloud service for sharing applications and automating workflows. These open platforms enable applications to be quickly assembled from components and eliminate integration difficulties between development, quality assurance (QA), and production environments.

The technology described herein improves microservice deployment and inter-operation by providing automated microservice trust management for microservice deployments. The microservice inter-operational trust management described herein establishes microservice trust relationships between microservices/containers in advance of (prior to) their respective inter-operational combined uses during their respective deployments. The technology described herein may result in both improved real-time/run-time performance of microservice deployment and automated security enhancement within complex microservices environments, such as cloud computing environments.

The technology described herein leverages a concept termed herein as "consensus," which represents a trust system that provides distributed microservice provisioning enforcement by agreement/consensus among microservices with respect to whether a particular microservice may be allowed to join and/or operate within a particular computing environment. All microservices that manage a distributed microservices trust ledger have to agree on any new or modified ledger entry including additions/deletions to the distributed microservices trust ledger. To facilitate agreement among microservices, microservice meta information, as described in more detail below, is distributed to all nodes within a computing environment to allow all nodes to not only be informed of a particular microservice joining and/or operating within a computing environment, but also to allow nodes to reject a particular microservice if appropriate. Any microservice may attempt to be introduced/added to the distributed microservices trust ledger. However, if a majority of microservices (or all microservices as appropriate) do not agree (i.e., achieve consensus), the introduced/added microservice will not be committed to the distributed microservices trust ledger. This voting system among microservices provides checks and balances that may be used to ensure that any rogue microservices may be identified and isolated from operations within the complex microservices environment.

A service infrastructure may provide operational management capabilities to detect and limit access by rogue services. Details of the service infrastructure operations within this context of detecting and limiting access by rogue services are omitted from the present description for brevity. Microservices may be signed (e.g., by use of digital certificates). Alternatively, if the service infrastructure allows use of unsigned services, the microservice meta information may be used to ensure that the microservice dependency information includes the other microservices that the introduced microservice is authorized to call.

By use of the technology described herein, microservice trust relationships may be established between containers/microservices prior to attempting to formulate connections for real-time processing. By establishing the microservice trust relationships in advance of attempting to formulate connections for real-time processing, the real-time connectivity and inter-operations may be expedited and the real-time processing may begin sooner than may otherwise be possible.

Further, as described in more detail below, the microservice trust relationships include detailed information as appropriate for the given implementation to allow vetting of requesting microservices that are authorized to establish connections with a given microservice. As well, because the microservice trust relationships are defined and propagated to each microservice container, microservices may themselves identify in real-time requesting microservices that are not authorized to establish connections with a respective microservice, again by use of the concept of consensus among distributed microservices. As such, security may be improved within complex microservice environments in a distributed decentralized manner.

The microservice inter-operational trust management described herein utilizes microservices ledger meta tags that provide a seamless and automated distributed container trust management system. This technology solves microservice deployment problems by providing a decentralized policy-based mechanism for management of microservice trust relationships between microservices. The microservice trust relationship may be established and based upon a distributed microservices ledger meta tags system that is maintained, updated, and managed in a decentralized manner, and that provides a robust and self-sustaining system for real-time microservices trust management.

The technology described herein ensures the integrity of microservices ledger meta tags by use of the distributed microservices trust ledger of meta tags and microservice trust relationships that are defined among the respective processing entities. As such, the distributed microservices trust ledger includes running entries of the pre-processed, in-process, and processed microservice entities. The distributed microservices trust ledger entries provide a trail for compliance verification, and additionally provide processing instructions for integration of microservices. As such, the microservices trust ledger may be considered "append only" (e.g., information may only be added to the ledger) to further assist with providing the trail for compliance verification (e.g., auditability) and for other purposes. Accordingly, even where microservices and/or trust relationships are updated or modified, all such updates and/or modifications may be documented and tracked.

The role of the distributed microservices trust ledger within a cloud computing environment is multi-faceted. For example, the distributed microservices trust ledger marks a request to establish a new trust relationship (e.g., a request to join a collective/group of nodes), and tags metadata about the trust and relationship. The microservices meta information contains information/parameters that define the microservice trust relationship, a time to live (TTL) of the microservice, a defined lifespan of any connection with the microservice, security provisions for any connection with the microservice, an application identifier of the microservice, services provided by the microservice, and other entity relationships (e.g., dependencies, etc.) of the microservice. Every node in the system maintains the ledger.

When a new system attempts to establish a trust relationship for a new microservice with other microservices, the new system provides a microservice trust token that includes the microservice meta information. The microservice meta information may include a designated/configured expiration and elements of the relevant distributed microservices trust ledger entries/parameters that are appropriate to support the microservice. The microservice trust token operates as a container identifier, in addition to including information about the configured relationship. The microservice meta information is added as a new microservices trust ledger entry, and this new entry is distributed to all microservices as part of the consensus model. Again, microservices may be denied inter-operation if consensus among the microservices is not achieved. Otherwise, the new microservices trust ledger entry may be committed to the distributed microservices trust ledger at all nodes to authenticate the new microservice for inter-operations within the microservices system.

For subsequent interactions between systems and microservices, the microservice trust token is passed. Prior to honoring the request, the TTL, validity of the request, and requested services are evaluated against the committed/valid entries within the distributed microservices trust ledger. As such, real-time inter-operations may be improved by utilizing the pre-authenticated information in the microservices trust ledger, without requiring negotiations for each inter-action or for each inter-operation among microservices.

The microservice trust token may be used for any of microservices clustering, services discovery, and security of container and inter-container microservice trust relationship verification. Use of the microservice trust token as an authentication information identifier avoids a requirement to establish trust every time services interact and, as such, may improve real-time/run-time performance of both microservice deployment and operation. The microservice trust relationship, as represented by the microservice trust token, is fundamentally different from encryption and other forms of conventional inter-system security measures.

The following example is provided to further illustrate details of the microservice trust relationship processing between microservices described herein. For purposes of the present example, it is presumed that "Microservice A" is to be introduced into a cloud computing environment. Within this example, the Microservice A is presumed to be deployed on an appropriate container for the respective platform. Microservice A has a configured microservice inter-dependency on (e.g., it utilizes a service provided by each of) "Microservice 1," on "Microservice 4," and on "Microservice 5.1." Additionally, the Microservice A may need to call "Microservice x" and "Microservice Y" as appropriate for the particular real-time processing involved.

When Microservice A is introduced in the cloud computing environment, a relationship token may be created and passed as part of an initialize/join operation to present a trust relationship for consideration among the existing microservices and nodes. The following microservice trust token pseudo syntax shows one possible implementation of a microservice trust token:

```
{
    Svc name: Micro service A
    Svc depend: Microservice 1, 4, 5.1
    Svc call: Microservice x, Y
    TTL: 240
    Life of svc: 3 days
    Security:
    Other Attributes: . . . .
}
```

Within the present example, the label "Svc name" identifies Microservice A. The label "Svc depend" identifies the dependent microservices "Microservice 1," "Microservice 4," and "Microservice 5.1." The label "Scv call" identifies the microservices "Microservice x" and "Microservice Y" that the Microservice A may need to call. The label "TTL" represents the time to live for the connection, where the numeral 240 is selected for purposes of example and may have units in seconds, minutes, or any unit appropriate for a given implementation. The label "Life of svc" indicates that the microservice has a configured life of the Microservice A itself, after which the Microservice A is either obsolete or a newer version may be made available and the older version may be retracted. The label "Security" defines security provisions for any connection with the microservice, and may be defined as appropriate for a given implementation. The label "Other attributes" generally represents any one or more additional attributes that may be appropriate for any given implementation.

It should be noted that the example of the microservice trust token pseudo syntax has been formatted to facilitate the present description. It should further be understood that any formatting of a microservice trust token that is appropriate for a given implementation is considered to be within the scope of the present subject matter.

A microservice trust token may be created when a microservice is first introduced into a system as a part of a microservice descriptor. The microservice trust token may then be added to a distributed microservices trust ledger that represents a data structure that every container/microservice distinctly maintains in the cloud computing environment. When consensus among all microservices is achieved, the microservice meta information within the microservice trust token may be committed to the distributed microservices trust ledger that is maintained by all microservices. The commitment of the microservices meta information to the distributed microservices trust ledger by all microservices effectively authorizes the new microservice to inter-operate within the respective microservices system.

The following distributed microservices trust ledger pseudo syntax shows one possible implementation of a microservices trust ledger that may be maintained by each container/microservice within a microservices system:

TABLE 1

Example Microservices Trust Ledger

<svc name: Microservice A, Svc depend: Microservice 1, 4, 5.1, Svc call: Microservice x, Y, TTL: 240, Life of svc: 3 days, Other Attributes: . . . . >
<svc name: Microservice B, Svc depend: Microservice 1, 4, 5.2, Svc call: Microservice x, V, TTL: 240, Life of svc: 4 days, Other Attributes: . . . . >
<svc name: Microservice C, Svc depend: Microservice 1, 4, 5.1, Svc call: Microservice x, Z, TTL: 240, Life of svc: 3 days, Other Attributes: . . . . >
<svc name: Microservice D, Svc depend: Microservice 1, 4, 5.3, Svc call: Microservice x, Y, TTL: 240, Life of svc: 2 days, Other Attributes: . . . . >

As can be seen from the example distributed microservices trust ledger pseudo syntax above, the first microservice relationship entry captures the microservice meta information from the microservice trust token of the Microservice A described in detail above. Similarly, the second through fourth microservices relationship entries each respectively capture information from a microservice trust token for a "Microservice B," a "Microservice C," and a "Microservice D."

Because each container maintains its own unique version of the distributed microservices trust ledger, every container may be continually aware of security attributes, dependencies, and other microservices that may be called (e.g., dependent microservices). Further, because the microservices trust ledger is updated using microservice trust tokens as services leave and are introduced, the microservices trust ledger maintained by each container may be dynamically updated. As such, each container may autonomously manage its own microservice trust relationships in a distributed manner by consensus with other containers without centralized control of configuration and responsibility management.

As with the microservice trust tokens discussed above, it should be noted that the example of the distributed microservices trust ledger pseudo syntax has been formatted to facilitate the present description. It should further be understood that any formatting of a distributed microservices trust ledger that is appropriate for a given implementation is considered to be within the scope of the present subject matter.

To further the description of container processing using a microservices trust ledger, the container may validate and expedite connection requests that include a relationship trust token for which the respective microservice meta information is already present within the local microservices trust ledger. Further, the container may immediately deny a connection request from any microservice that does not have a previously provided relationship trust token present within the local microservices trust ledger.

As such, the present technology may avoid additional real-time processing to request security certificates for every communication between containers because the microservice trust relationship has already been established between the appropriate microservices. Further, because the microservice trust relationship, as defined in the microservice trust token/ledger, defines the authorized time frames (for connections and microservice life spans), rogue microservices that issue requests outside of the defined authorized time frames may be denied interaction because the requesting microservice does not have an established microservice trust relationship during the requesting time period. Additionally, because the microservice trust relationship, as defined in the microservice trust token/ledger, defines correct authorized versions of microservices (e.g., version 1.4), incorrect versions of the requesting microservice (e.g., an older version 1.1) may be denied interaction because the requesting microservice does not have an established microservice trust relationship.

It should be noted that conception of the present subject matter resulted from recognition of certain limitations associated with microservice deployment. For example, it was observed that, while containers are intended to be lightweight, single deployable units, containers are only useful due to their ability to resolve dependencies and interoperate with other microservices. It was determined that due to an increasingly large scale of container deployments, and the distributed and decoupled nature of these deployments, the management and security of these containers during deployment has become increasingly challenging. Additionally, due to the short lifetimes of microservices and the distributed nature of containers, a centralized system for management and security is not practical or feasible due to the real-time costs and increasing complexities involved. The present subject matter improves microservices deployment by providing for microservice inter-operational trust management, as described above and in more detail below. As such, improved microservice deployment and automated trust management may be obtained through use of the present technology.

The microservice inter-operational trust management described herein may be performed in real time to allow prompt deployment and trust management of microservices within complex computing environments. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additionally, the present technology may be implemented within or as part of a cloud computing environment, or may be implemented as a customized microservices system solution. As such, the following description of a cloud computing environment is provided with the understanding that a customized microservices system solution may utilize technical implementation details appropriate for the given implementation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
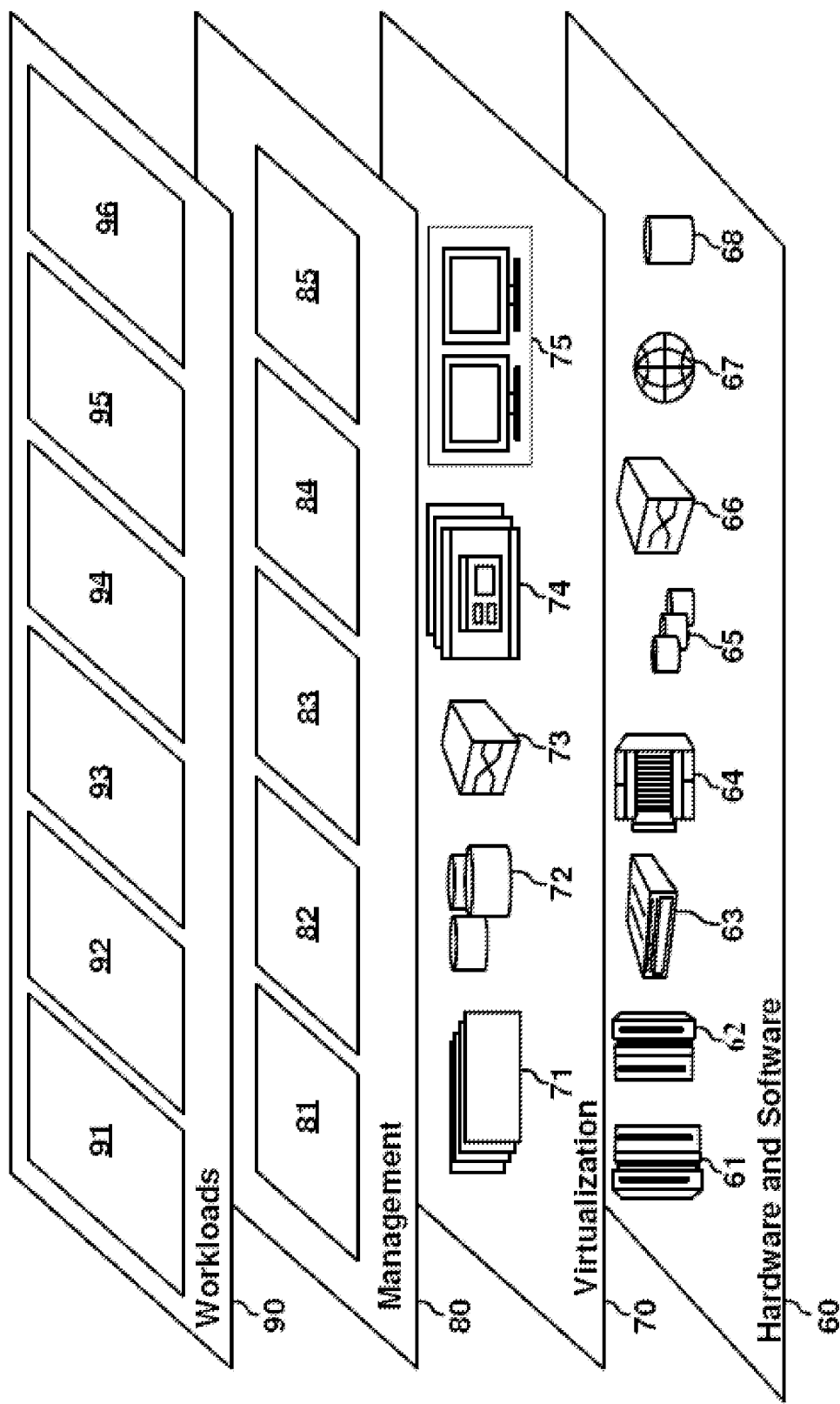
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice inter-operational trust management 96.

Figure 3:
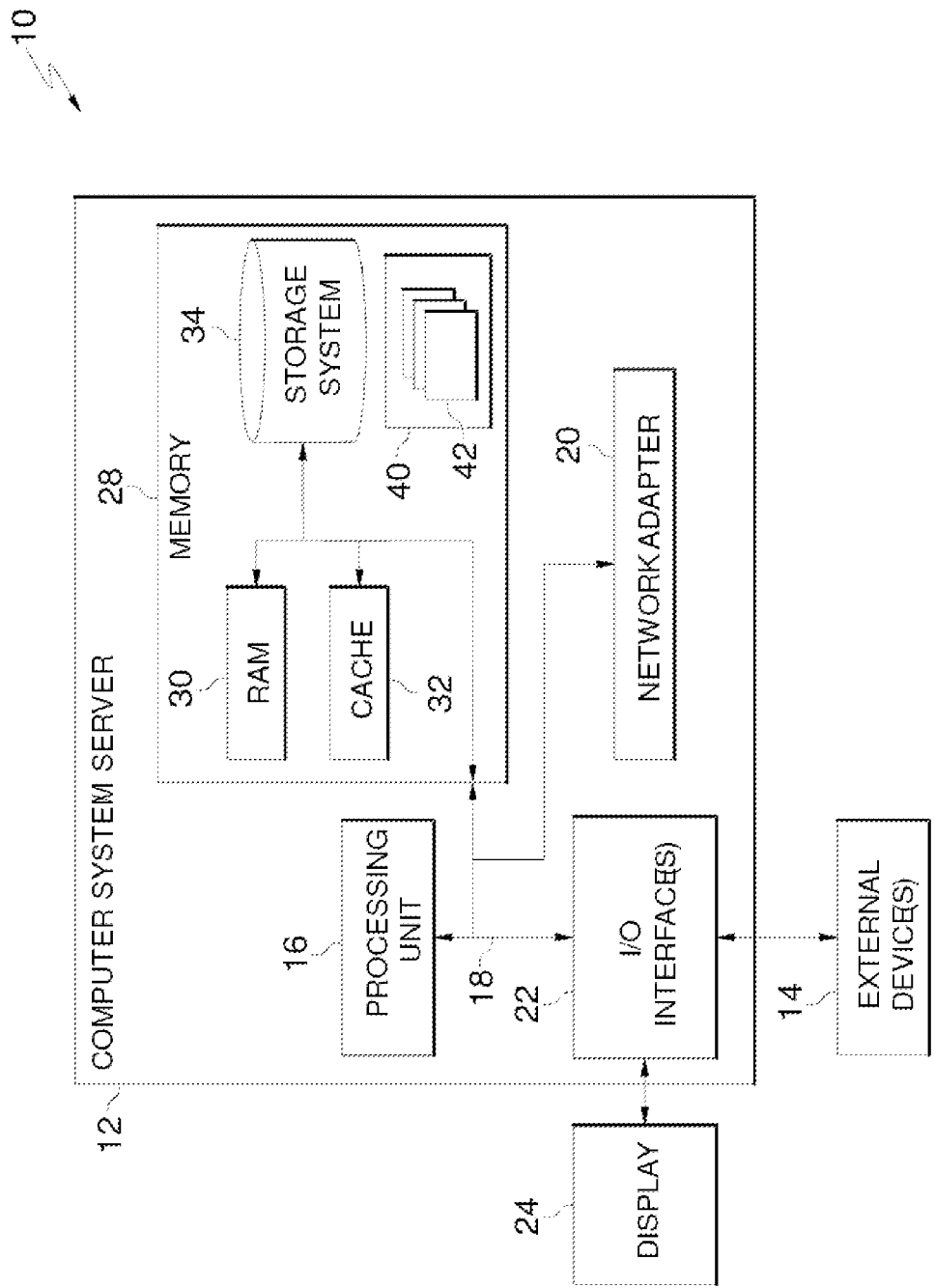
FIG. 3 depicts a portion of a cloud computing node according to an embodiment of the present invention.

Continuing with the description of the microservice inter-operational trust management described herein, and referring now to FIG. 3, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
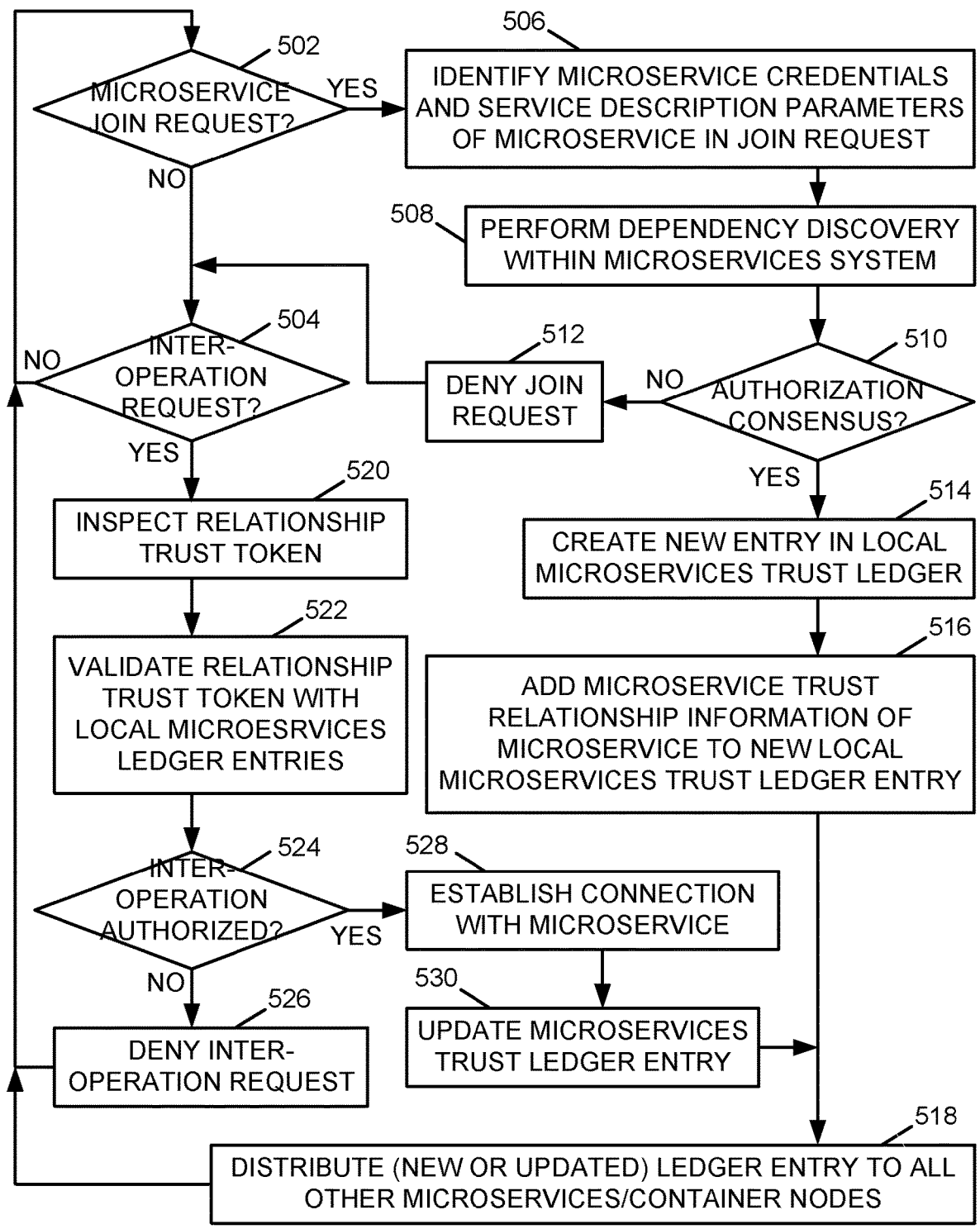
FIG. 5 is a flow chart of an example of an implementation of a process for microservice inter-operational trust management that facilitates distributed container-based control of provisioning and inter-operation of microservices in a cloud computing environment or other microservices environment according to an embodiment of the present subject matter.

FIG. 4 through FIG. 5 described below represent example processes that may be executed by devices, such as the such as the cloud computing node 10, to perform the automated microservice inter-operational trust management associated with the present subject matter. Many other variations on the example processes are possible and all are considered within the scope of the present subject matter. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for microservice inter-operational trust management. The process 400 represents a computer-implemented method of performing the subject matter described herein. At decision point 402, the process 400 receives, by a processor executing a first microservice from a second microservice within a microservices system, a microservice join request comprising microservice trust relationship information of the second microservice that defines microservice credentials and service description parameters of the second microservice. At block 404, the process 400 determines, using the microservice trust relationship information of the second microservice, whether a consensus exists among other microservices within the microservices system that the second microservice is authorized to inter-operate within the microservices system. At block 406, the process 400 creates, in response to determining that the consensus exists, validated local run-time inter-operational microservice trust relationship information. At block 408, the process 400 receives at least one run-time inter-operation request that comprises a relationship trust token from the second microservice. At block 410, the process 400 establishes a run-time inter-operational connection with the second microservice in response to determining that parameters of the relationship trust token match the defined microservice credentials and service description parameters of the second microservice within the validated local run-time inter-operational microservice trust relationship information.

FIG. 5 is a flow chart of an example of an implementation of a process 500 for microservice inter-operational trust management. The process 500 represents a computer-implemented method of performing the subject matter described herein. The computer-implemented method facilitates distributed container-based control of provisioning and inter-operation of microservices in a cloud computing environment or other microservices environment. The process 500 allows microservices to manage their own run-time inter-operational connection authentication using validated local run-time inter-operational microservice trust relationship information, as described above and in more detail below.

At decision point 502, the process 500 begins higher-level iterative processing by determining whether a microservice join request has been received that includes microservice trust relationship information, as described above and in more detail below. Processing responsive to an affirmative determination at decision point 502 will be deferred and described in detail further below. In response to determining that a microservice join request has not been received, the process 500 makes a determination at decision point 504 as to whether a microservices run-time inter-operation request has been received that includes a relationship trust token. As with decision point 502, processing responsive to an affirmative determination at decision point 504 will be deferred and described in detail further below. In response to determining that a microservices run-time inter-operation request has not been received, the process 500 returns to decision point 502 and iterates as described above.

Returning to the description of decision point 502, it should be noted that a join request may be issued by a microservice/container and received when a new microservice/container joins a collective/group of nodes that the new microservice/container is configured to interact within a microservices system. The configured interactions may be either for purposes of clustering group services or for dependency-based service creation. It should further be noted that a join request may include microservice trust relationship information of the requesting microservice that may be used to form a consensus among operating microservices regarding the join request. For example, the microservice trust relationship information of the requesting microservice may define microservice credentials (e.g., microservice name, etc.) and service description parameters (e.g., meta information) of the requesting microservice. The service description parameters may include a time to live (TTL) of the microservice, security provisions for any connection with the microservice, a defined lifespan of any connection with the microservice, an application identifier of the microservice, services provided by the microservice, and other microservice entity dependencies of the requesting microservice.

In response to determining that a microservice join request has been received that includes microservice trust relationship information at decision point 502, the process 500 identifies the microservice credentials and service description parameters of the microservice in the join request at block 506. At block 508, the process 500 begins processing to determine whether a consensus exists among other microservices within the microservices system that the microservice is authorized to inter-operate within the microservices system by performing dependency discovery within the microservices system using the microservice trust relationship information, including any microservice entity dependencies of the requesting microservice. The other microservices may inspect the microservice trust relationship information and confirm or deny that any listed dependent service or similar service (e.g., cluster) exists, and may respond that the join request may be honored or declined as appropriate based upon the microservice meta information. As such, the process 500 uses the received microservice trust relationship information of the requesting microservice to determine by consensus with other microservices whether the new requesting microservice is authorized to inter-operate, including using other microservices for its configured dependencies.

At decision point 510, the process 500 makes a determination as to whether a consensus exists among other microservices within the microservices system that the requesting microservice is authorized to inter-operate within the microservices system. In response to determining that a consensus does not exist among the other microservices regarding whether the requesting microservice is authorized to inter-operate within the microservices system, the process 500 denies the join request of the requesting microservice at block 512, and returns to decision point 504 and iterates as described above and in more detail below.

Alternatively, in response to determining at decision point 510 that a consensus does exist among the other microservices regarding whether the requesting microservice is authorized to inter-operate within the microservices system, the process 500 documents the microservice trust relationship information of the requesting microservice as validated run-time inter-operational microservice trust relationship information for use in the microservices system. To document the validated run-time inter-operational microservice trust relationship information, the process 500 creates a new entry in a locally-maintained (local) microservices trust ledger at block 514. The new entry in the local microservices trust ledger may be used to store the defined microservice credentials and service description parameters of the requesting microservice for locally-managed authentication of subsequent connection and inter-operation requests from the microservice.

At block 516, the process 500 adds the received microservice trust relationship information (e.g., microservice credentials and service description parameters) to the new entry within the local microservices trust ledger. At block 518, the process 500 distributes the new local microservices trust ledger entry that includes the validated run-time inter-operational microservice trust relationship information to the other microservices within the microservices system. The distribution of the ledger entry is how the process 500 and the other microservices collectively confirm the join request, which represents a relationship of trust among microservices. Service invocation (for dependent services) or cluster membership may be recorded and the presented meta information may be kept in a distributed ledger and passed around to all the container nodes so that all microservices have a copy of the relationship definition. It should be noted that the block 518 is reused in the diagram for distribution of updated ledger entries, as described in more detail further below.

The new microservice that has been validated by consensus may now issue microservices run-time inter-operation requests to the microservice that performs the process 500. The process 500 returns to decision point 502 and iterates as described above.

Returning to the description of decision point 504, it should be noted that to facilitate run-time validation of connection requests, the received run-time inter-operation request includes a relationship trust token. The relationship trust token includes some or all of the original microservice trust relationship information of the respective microservice that defines the microservice credentials and service description parameters of the respective microservice. The relationship trust token is presented on every interaction and service invocation of group services. The relationship trust token may also be instrumental in invocation of adjacent services or addition of new services, as appropriate for a given implementation.

In response to determining at decision point 504 that a microservices run-time inter-operation request has been received that includes a relationship trust token, the process 500 inspects the relationship trust token at block 520. At block 522, the process 500 validates the received relationship trust token with local microservices trust ledger entries to determine whether the received run-time inter-operation request may be granted or denied. The process 500 may compare the microservice credentials and service description parameters of the relationship trust token with individual ledger entries to determine whether there is a match with any validated local run-time inter-operational microservice trust relationship information. As such, the process 500 inspects the relationship trust token for validation, TTL, expiration, or change in dependency or membership governance. Each inspection of a relationship trust token may be followed by a validation and update of the respective locally-maintained microservices trust ledger entry.

At decision point 524, the process 500 makes a determination as to whether the run-time inter-operation request is authorized. In response to determining that the run-time inter-operation request is not authorized, the process 500 denies the run-time inter-operation request at block 526. The process 500 returns to decision point 502 and iterates as described above.

Alternatively, in response to determining that the run-time inter-operation request is authorized, the process 500 establishes a run-time inter-operational connection with the requesting microservice at block 528. Determining that the run-time inter-operation request is authorized is based upon a determination that parameters of the relationship trust token match the defined microservice credentials and service description parameters of the requesting microservice within the validated local run-time inter-operational microservice trust relationship information. At block 530, the process 500 updates the respective microservices trust ledger entry, such as to document the inter-operation for compliance, auditing, or other purposes as appropriate for a given implementation. The process 500 distributes the updated local microservices trust ledger entry that includes the updated run-time inter-operational microservice trust relationship information to the other microservices within the microservices system. The process 500 returns to decision point 502 and iterates as described above As such, the process 500 facilitates distributed container-based control of provisioning and inter-operation of microservices in a cloud computing environment or other microservices environment. The process 500 allows microservices to manage their own run-time inter-operational connection authentication using validated local run-time inter-operational microservice trust relationship information, as described above and in more detail below.

As described above in association with FIG. 1 through FIG. 5, the example systems and processes provide microservice inter-operational trust management. Many other variations and additional activities associated with microservice inter-operational trust management are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
by a processor executing a first microservice:
receiving, from a second microservice that is autonomously initiating its own container-level deployment within a microservices system according to its own configured microservice inter-dependency data, a microservice join request comprising microservice trust relationship information of the second microservice that defines microservice credentials and service description parameters that specify inter-operational details usable for consensus-based automated deployment of the second microservice within the microservices system;
determining, using the microservice trust relationship information of the second microservice, whether a consensus exists among other microservices within the microservices system that the second microservice is to be authorized to inter-operate within the microservices system; and
creating, in response to determining that the consensus exists, validated local run-time inter-operational microservice trust relationship information that authorizes the second microservice to manage its own run-time inter-operational connection authentication within the microservices system.

2. The computer-implemented method of claim 1, where creating, in response to determining that the consensus exists, the validated local run-time inter-operational microservice trust relationship information comprises:
adding the received microservice trust relationship information as a new entry within a locally-maintained microservices trust ledger, where the new entry within the locally-maintained microservices trust ledger comprises the validated local run-time inter-operational microservice trust relationship information.

3. The computer-implemented method of claim 1, where:
the first microservice manages its own run-time inter-operational connection authentication using the validated local run-time inter-operational microservice trust relationship information;
the defined microservice credentials of the second microservice comprise a microservice name of the second microservice; and
the defined service description parameters of the second microservice comprise a time to live (TTL) of the second microservice, security provisions for any connection with the second microservice, a defined lifespan of any connection with the second microservice, an application identifier of the second microservice, services provided by the second microservice, and other microservice entity dependencies of the second microservice.

4. The computer-implemented method of claim 1, where the defined service description parameters of the second microservice comprise microservice entity dependencies of the second microservice, and the other microservices among which the consensus is determined comprise microservices listed within the microservice entity dependencies of the second microservice.

5. The computer-implemented method of claim 1, further comprising distributing the validated local run-time inter-operational microservice trust relationship information to the other microservices within the microservices system.

6. The computer-implemented method of claim 1, further comprising denying the microservice join request in response to determining the consensus does not exist among the other microservices regarding whether the second microservice is to be authorized to inter-operate within the microservices system.

7. The computer-implemented method of claim 1, where the computer-implemented method facilitates distributed container-based control of provisioning and inter-operation of microservices in a cloud computing environment.

8. A system, comprising:
a memory; and
a processor executing a first microservice programmed to:
receive, from a second microservice that is autonomously initiating its own container-level deployment within a microservices system according to its own configured microservice inter-dependency data, a microservice join request comprising microservice trust relationship information of the second microservice that defines microservice credentials and service description parameters that specify inter-operational details usable for consensus-based automated deployment of the second microservice within the microservices system;
determine, using the microservice trust relationship information of the second microservice, whether a consensus exists among other microservices within the microservices system that the second microservice is to be authorized to inter-operate within the microservices system; and
create, within the memory in response to determining that the consensus exists, validated local run-time inter-operational microservice trust relationship information that authorizes the second microservice to manage its own run-time inter-operational connection authentication within the microservices system.

9. The system of claim 8, where in being programmed to create, within the memory in response to determining that the consensus exists, the validated local run-time inter-operational microservice trust relationship information, the processor executing the first microservice is programmed to:
add the received microservice trust relationship information as a new entry within a locally-maintained microservices trust ledger, where the new entry within the locally-maintained microservices trust ledger comprises the validated local run-time inter-operational microservice trust relationship information.

10. The system of claim 8, where:
the first microservice manages its own run-time inter-operational connection authentication using the validated local run-time inter-operational microservice trust relationship information;
the defined microservice credentials of the second microservice comprise a microservice name of the second microservice; and
the defined service description parameters of the second microservice comprise a time to live (TTL) of the second microservice, security provisions for any connection with the second microservice, a defined lifespan of any connection with the second microservice, an application identifier of the second microservice, services provided by the second microservice, and other microservice entity dependencies of the second microservice.

11. The system of claim 8, where the defined service description parameters of the second microservice comprise microservice entity dependencies of the second microservice, and the other microservices among which the consensus is determined comprise microservices listed within the microservice entity dependencies of the second microservice.

12. The system of claim 8, where the processor executing the first microservice is further programmed to distribute the validated local run-time inter-operational microservice trust relationship information to the other microservices within the microservices system.

13. The system of claim 8, where the processor executing the first microservice is programmed to facilitate distributed container-based control of provisioning and inter-operation of microservices in a cloud computing environment.

14. A computer program product, comprising:
a computer readable storage medium having computer readable program code embodied therewith, where the computer readable storage medium is not a transitory signal per se and where the computer readable program code when executed on a computer executing a first microservice causes the computer to:
receive, from a second microservice that is autonomously initiating its own container-level deployment within a microservices system according to its own configured microservice inter-dependency data, a microservice join request comprising microservice trust relationship information of the second microservice that defines microservice credentials and service description parameters that specify inter-operational details usable for consensus-based automated deployment of the second microservice within the microservices system;
determine, using the microservice trust relationship information of the second microservice, whether a consensus exists among other microservices within the microservices system that the second microservice is to be authorized to inter-operate within the microservices system; and
create, in response to determining that the consensus exists, validated local run-time inter-operational microservice trust relationship information that authorizes the second microservice to manage its own run-time inter-operational connection authentication within the microservices system.

15. The computer program product of claim 14, where, in causing the computer to create, in response to determining that the consensus exists, the validated local run-time inter-operational microservice trust relationship information, the computer readable program code when executed on the computer executing the first microservice causes the computer to:
add the received microservice trust relationship information as a new entry within a locally-maintained microservices trust ledger, where the new entry within the locally-maintained microservices trust ledger comprises the validated local run-time inter-operational microservice trust relationship information.

16. The computer program product of claim 14, where:
the first microservice manages its own run-time inter-operational connection authentication using the validated local run-time inter-operational microservice trust relationship information;

the defined microservice credentials of the second microservice comprise a microservice name of the second microservice; and the defined service description parameters of the second microservice comprise a time to live (TTL) of the second microservice, security provisions for any connection with the second microservice, a defined lifespan of any connection with the second microservice, an application identifier of the second microservice, services provided by the second microservice, and other microservice entity dependencies of the second microservice.

17. The computer program product of claim 14, where the defined service description parameters of the second microservice comprise microservice entity dependencies of the second microservice, and the other microservices among which the consensus is determined comprise microservices listed within the microservice entity dependencies of the second microservice.

18. The computer program product of claim 14, where the computer readable program code when executed on the computer executing the first microservice further causes the computer to distribute the validated local run-time inter-operational microservice trust relationship information to the other microservices within the microservices system.

19. The computer program product of claim 14, where the computer readable program code when executed on the computer executing the first microservice further causes the computer to deny the microservice join request in response to determining the consensus does not exist among the other microservices regarding whether the second microservice is to be authorized to inter-operate within the microservices system.

20. The computer program product of claim 14, where the computer readable program code when executed on the computer executing the first microservice facilitates distributed container-based control of provisioning and inter-operation of micro services in a cloud computing environment.

* * * * *